Aug. 10, 1965  N. J. HVISTENDAHL  3,199,734
DISPENSER
Filed April 15, 1963  2 Sheets-Sheet 1
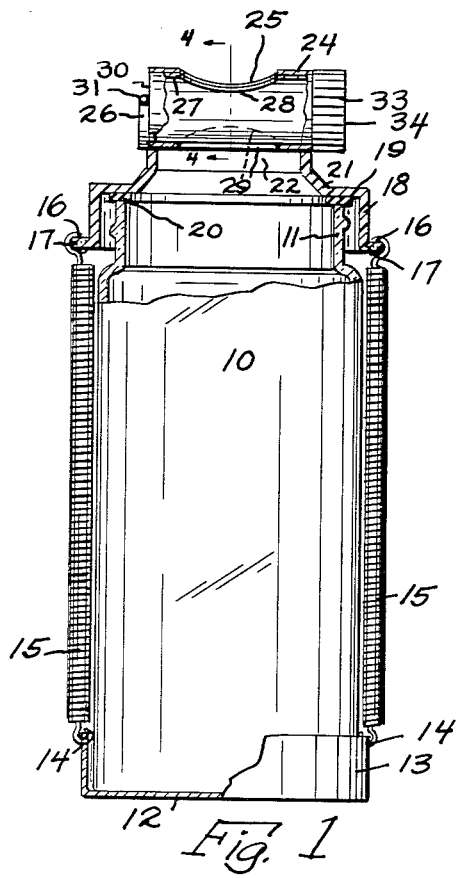
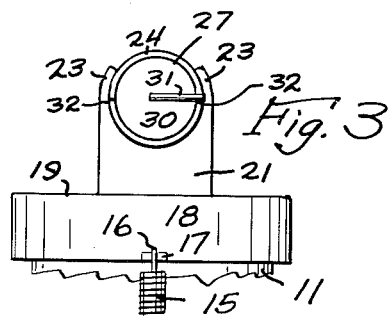
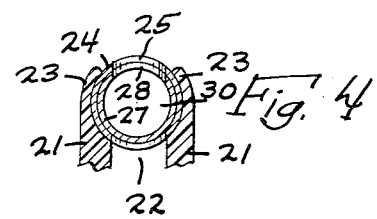
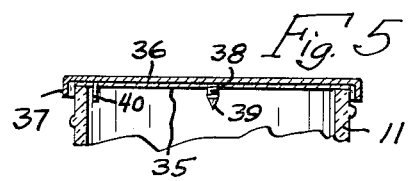
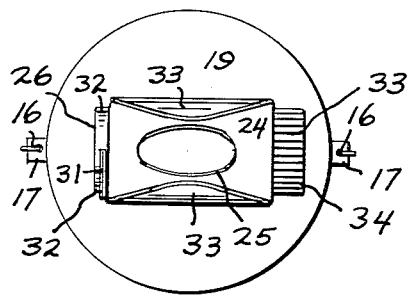
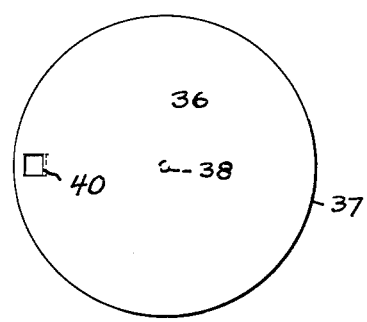
INVENTOR.
Nels J. Hvistendahl
BY
Sam J. Slotsky
ATTORNEY Aug. 10, 1965   N. J. HVISTENDAHL   3,199,734
DISPENSER
Filed April 15, 1963   2 Sheets-Sheet 2

INVENTOR.
Nels J. Hvistendahl
BY
Sam J. Slotsky
ATTORNEY

United States Patent Office 3,199,734
Patented Aug. 10, 1965

3,199,734
DISPENSER
Nels J. Hvistendahl, 1324 S. Mulberry St.,
Sioux City, Iowa
Filed Apr. 15, 1963, Ser. No. 272,896
1 Claim. (Cl. 222—83.5)

My invention relates to a dispenser.

An object of my invention is to provide a dispenser unit which can be easily attached to a jar or other similar container after the cover has been removed, and whereby a certain pre-determined amount of coffee or any other substance, can be regulated as to quantity and dispensed directly from the jar.

A further object of my invention is to provide a device which will be securely held to the jar, which will accommodate different sized jars, and which can be manufactured at a reasonable cost and will provide the dispensing operation readily.

A further object of my invention is to provide an auxiliary device for conveniently and quickly removing the thin cardboard or paper covering members of jars.

A further object of my invention is to provide an arrangement in combination with the dispenser unit which will remove the thin cardboard or paper covering members of jars.

Figure 7:
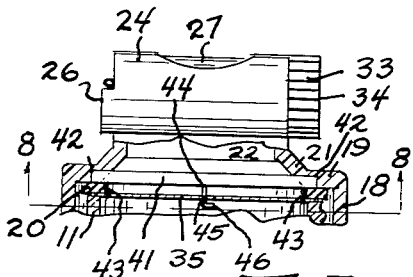
Figure 9:
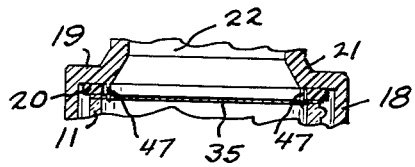
Figure 8:
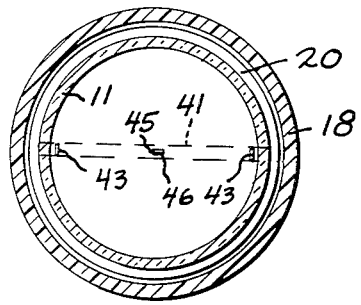

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a partially cross sectional view of an elevation of my dispenser as attached to a jar, FIGURE 2 is a plan view of FIGURE 1, FIGURE 3 is an end view of a portion of FIGURE 1, FIGURE 4 is a sectional view of FIGURE 1 taken along the lines 4—4 thereof, FIGURE 5 is a sectional view of the auxiliary device, FIGURE 6 is a plan view of FIGURE 5, FIGURE 7 is a modification, FIGURE 8 is a sectional view of FIGURE 7 taken along the lines 8—8 thereof, and FIGURE 9 is a further modification.

My invention contemplates the provision of a device which can be attached to a standard coffee jar of the type of instant coffee or the like and which will include dispensing features as explained above.

In describing my invention, I have used the character 10 to designate a standard jar containing the material to be dispensed, the character 11 indicating the neck portion of the jar, and I have further used the character 12 to indicate the bottom of a lower jar receiving member having the cylindrical wall 13 to which are attached at 14 a pair of coiled springs 15 which are attached as at 16 to the lugs 17 which lugs extend integrally from a cylindrical cap member 18 which extends into the portion 19 to which portion 19 is secured a rubber or other circular gasket 20, the portion 19 extending into the further portion 21 having an opening at 22.

Extending from the portion 21 are the arcuate portions 23 which securely receive an outer cylindrical member 24 having an opening 25 therein, this cylindrical member 24 including the extending arcuate portion 26, and snugly received within the member 24 is a further cylindrical member 27 having a similar opening 28, the outer member 24 including an opening 29. The inner cylindrical member 27 includes the end wall 30 to which is attached a radially positioned pin 31 adapted to abut against the member 26 at 32 to limit rotatable movement of the inner member 27 and attached to the member 27 is the extending knurled portion 33 terminating in the further end wall 34.

The device is used in the following manner:

After the usual cap has been unscrewed from the jar 10, the lower member 13 is placed over the bottom of the jar 10, and the upper cap member 18 is forced over the top of the neck 11, and the device is then ready for use, since the springs 15 will securely hold the upper and lower units together.

The capacity of the inner cylindrical member 27 is the amount necessary for one unit of discharge from the jar, and in the case of coffee, etc., this amount can be approximately one heaping teaspoonfull, and to use the dispenser, the knurled portion 33 is first rotated so that the opening 28 will coincide or communicate with the opening 29, whereupon, when the jar is turned upside down, a portion of the contents will fall into the cylindrical member 27, the opening 25 at this point being closed.

The knurled portion 33 is then rotated until the opening 28 communicates with the openings 25, whereupon the contents will be discharged from the dispenser unit, these contents being the correct amount.

It will be noted that the unit can be readily placed on varying sizes of jars, the gasket 20 providing a firm seal, etc., and with the pin 31 limiting movement to the required degree of rotation.

FIGURES 5 and 6 illustrate an auxiliary device which can be used in connection with the dispenser and wherein the character 35 indicates the top paper member which is usually glued to the top rim of the neck 11, and this auxiliary device comprises a cap member 36 having the annular flange 37, and attached to the member 36 is a screw 38 terminating in the point 39, and bent downwardly from the member 36 is a sharpened portion 40.

This device is used by merely pressing the member 36 firmly downwardly whereupon the member 40 will penetrate through the paper 35 as will the member 38, and by merely rotating the member 36 in a complete circle, the paper member will be cut away in the form of a disc, and the threaded member 38 will thread into the paper so that when the member 36 is removed, the paper disc will be brought away with the cap, thus providing a handy tool for this purpose.

FIGURES 7 and 8 disclose a modification wherein the dispenser unit can be also used to remove the top paper member, and wherein identical characters designate identical parts, and in this modification, I provide a transverse radially position bar 41 which is securely molded as at 42 into the material of the upper portion 19, and extending from the member 41 are a pair of blade members 43 which will extend downwardly so as to penetrate the paper member 35, the blades 43 being positioned so that they are fairly close to the neck of the jar, and attached at 44 to the center of the bar 41, is a thin wire member 45 having the portion 46 bent at right angles thereto.

This arrangement is used in the following manner. Before the units 13 and the upper dispensing unit are clamped on the jar, the upper unit is first used by merely pressing it downwardly over the neck of the jar, whereupon the blades 43 and the member 45 will press downwardly through the paper member 35, and whereupon the arrangement is then rotated 180° which will cut out the disc of paper 35, and the portion 46 will then be positioned beneath a portion of the paper disc 35, since it will be at the opposite position, and whereupon removal of this upper dispenser unit will then cause the portion 46 to raise the paper disc away from the jar and the units can then be placed in the position shown in FIGURE 1 for use.

FIGURE 9 illustrates a still further form for removing the top 35, and wherein the thin blades 47 are formed integrally from the moulded portion 19, there being two or three of these blades, and whereby these blades will penetrate the top 35 and then the unit will be rotated to cut the top away, which top is then manually removed.

It will now be noted that I have provided the various advantages mentioned in the objects of my invention with further advantages being apparent.

Some changes may be made in the construction and arrangement of the parts of my invention without departing from the real spirit and purpose of my invention, and it is my invention to cover by my claim any modified form of structure or use of mechanical equivalents which may be reasonably included within its scope.

I claim as my invention:

A dispenser comprising a lower substantially cup shaped member adapted to receive the bottom portion of a receptacle, a dispenser unit adapted to receive the upper neck portion of said receptacle, resilient means attached between said cup shaped member and said dispenser for firmly supporting said dispenser unit against said neck portion, said dispenser unit including an outer shell, and an inner shell snugly engaged with said outer shell, said outer shell having an opening communicating with said receptacle, and having a further opening positioned oppositely to said opening, said inner shell having a still further opening adapted to communicate with either said opening, or said further opening, said dispenser unit including a transverse bar attached thereto, a pair of blade members attached to said transverse bar at opposite ends thereof, and being adapted to penetrate through and cut the paper covering top of a receptacle, a centrally positioned downwardly projecting prong attached to said bar, said prong having an end portion at right angles thereto, for removing said paper covering top.

References Cited by the Examiner

UNITED STATES PATENTS

| | | | |
|---|---|---|---|
| 515,663 | 2/94 | Earl et al. | 30—18 |
| 579,086 | 3/97 | Berntsen | 30—18 |
| 618,783 | 1/99 | Cameron | 30—17 |
| 1,199,502 | 9/16 | Schuyler et al. | 222—263 X |
| 1,394,210 | 10/21 | Miller | 222—268 X |
| 1,632,933 | 6/27 | Thornton | 222—82 |
| 1,710,295 | 4/29 | Campbell | 222—363 |
| 2,518,520 | 8/50 | Broun | 222—268 |
| 2,823,832 | 2/58 | Potter | 222—83.5 X |
| 3,031,112 | 4/62 | Smith | 222—270 |

FOREIGN PATENTS

| | | |
|---|---|---|
| 977,370 | 3/51 | France. |
| 573,684 | 4/33 | Germany. |

RAPHAEL M. LUPO, *Primary Examiner.*

ERNEST A. FALLER, Jr., LOUIS J. DEMBO,
*Examiners.*